United States Patent Office 3,389,154
Patented June 18, 1968

3,389,154
17α-ACETOXY-6-METHYLPREGNA-4,6-DIENE-3,11, 20-TRIONE AND INTERMEDIATES FOR PRODUCING SAME
Derek Burn and Vladimir Petrow, London, England, assignors to The British Drug Houses Limited
No Drawing. Filed June 28, 1966, Ser. No. 561,008
Claims priority, application Great Britain, July 1, 1965, 27,862/65
3 Claims. (Cl. 260—397.45)

ABSTRACT OF THE DISCLOSURE

This invention is for improvements in or relating to organic compounds and has particular reference to 17α-acetoxy-6-methylpregna - 4,6 - diene-3,11,20-trione. This compound has utility in the therapeutic field for such functions as ovulation inhibition. It is produced from 17α-hydroxypregn-4-ene-3,11-20-trione by the Vilsmeier technique, the novel intermdeiates 17α-acetoxy-6-formyl-3-methoxypregna-3,5-diene-11,20-dione and 17α-acetoxy-6-methylenepregna-4-ene-3,11,20-trione being produced en route to the end product.

---

It is an object of the present invention to provide the novel compound 17α-acetoxy-6-methylpregna-4,6-diene-3,11,20-trione, represented by the Formula I and intermediate compounds in the preparation thereof as described below.

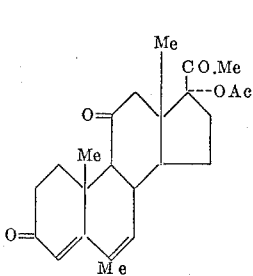
(I)

The compound of the present invention (I) is of value on account of its progestational, ovulation-inhibiting and gonadotrophin-inhibiting properties. In conjunction with an oestrogen such as for example ethynyloestradiol, mestranol, 17α-chlorethynyl (17α-bromoethynyl) oestradiol and its 3-methyl and 3,17-dimethyl ether, 17α-trifluoropropynyl oestradiol and its 3-methyl and 3,17-dimethyl ether, 17α-trifluorovinyl oestradiol and its 3-methyl and 3,17-dimethyl ether, the compound of the present invention is of value as an oral contraceptive. In addition, the compound is of value in veterinary work for the synchronisation of oestrus and for inhibition of ovulation. Such formulations may be administered as pills, tablets and other standard pharmaceutical formulations either in the conventional 20 days/month regimens or in sequential or serial regimens. The progestationally active 17α-acyloxypregnan-20-one derivatives are of value in various gynaecological disorders such as dysmenorrhea, in endometriosis, disfunctional uterine bleeding, premenstrual tension syndrome, the postponement of normal menstruation, primary and secondary amenorrhea, subfertility and inhibition of lactation, and may be administered in standard pharmaceutical formulations for these purposes.

The compound of the present invention 17α-acetoxy-6-methylpregna-4,6-diene-3,11,20-trione (I) may be prepared by application of the Vilsmeier techniques as described in our British Patents Nos. 929,983, 929,984, 929,985, 941,121, 941,122 and 957,222.

A convenient starting material for the process of the present invention is 17α-hydroxypregn-4-ene-3,11,20-trione (II), which has been described by, for example, Bernstein, Brown, Feldman and Rigler in Jour. Amer. Chem. Soc., 1959, 81, 4956.

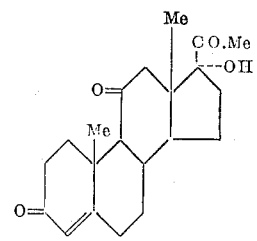
(II)

Compound II is first reacted in such a manner as to convert it into 17α-acetoxypregn-4-ene-3,11,20-trione (III).

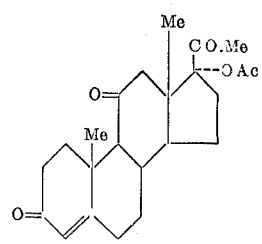
(III)

During the course of this reaction, the carbonyl group at $C_3$ is also attacked to a certain degree with the formation of the enol acetate (IV).

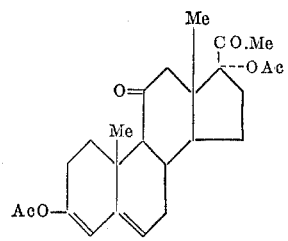
(IV)

It has been found that the maximum yield of the required 17-acetate (III) is therefore obtained by submitting the product of the acetylation reaction to a hydrolytic procedure prior to purification in order to convert any enol acetate (IV) into the required 3-ketone (III). Thus the 17α-hydroxypregn-4-ene-3,11,20-trione (II) may be dissolved or suspended in acetic anhydride, optionally admixed with acetic acid, preferably in the presence of a strong acid catalyst such, for example, as toluene-p-sulphonic acid, until reaction is completed. The reaction may be run at temperatures between ambient and the boiling point of the solvent, and conveniently at about 50° C. when reaction is complete within about 4 hours. The product, which may be isolated by pouring the reaction mixture into water followed by filtration, is then submitted to a hydrolytic stage, conveniently under acidic conditions. Thus the product may be dissolved or suspended in a suitable, water miscible organic solvent such, for example, as a lower aliphatic alcohol and treated with an acid catalyst such, for example, as hydrochloric acid. The reaction may be conducted at temperatures between ambient and the boiling point of the solvent, and is generally completed within 2 hours at the latter. The product may be isolated by dilution of the reaction mixture with water followed by purification of the resulting precipitate by conventional techniques. The required 6-methyl group and 6,7-double bond are conveniently introduced into 17α-acetoxypregn-4-ene-3,11,20-trione (III) by application of the Vilsmeier and subsequent reactions.

Compound IV is converted into a 3-enol ether, conveniently the 3-enol methyl ether V, 17α-acetoxy-3-methoxypregna-3,5-diene-11,20-dione,

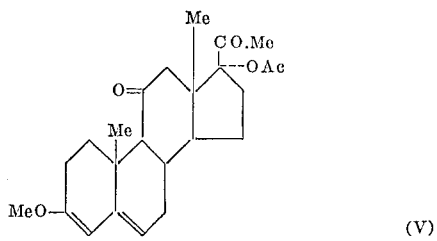

(V)

by treatment with an alkyl ortho formate in the presence of an acidic catalyst such, for example, as sulphuric acid or toluene-p-sulphonic acid.

According to one modification of the process the 3-enol methyl ether V may be treated with a Vilsmeier reagent derived from dimethylformamide and an acid halide such, for example, as phosgene or phosphoryl chloride to produce 17α-acetoxy-6-formyl-3-methoxypregna-3,5 - diene-11,20-dione VI

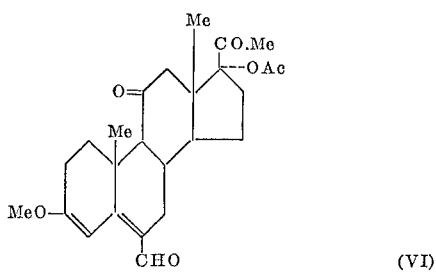

(VI)

Reduction of the formyl group in Compound VI is readily effected by use of a metal borohydride such, for example, as sodium borohydride or lithium borohydride. Other reducing techniques including, for example, catalytic hydrogenation over a platinum on charcoal catalyst may also be employed. The resulting 17α-acetoxy-6-hydroxymethyl-3-methoxypregna-3,5-diene-11,20-dione VII

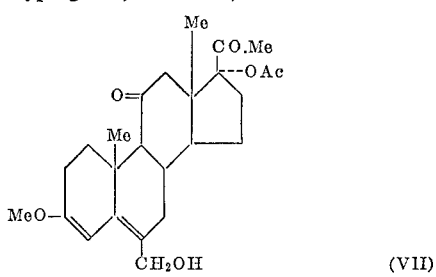

(VII)

is then treated with acid, conveniently without purification, in order to convert it into 17α-acetoxy-6-methylene-pregn-4-ene-3,11,20-trione VIII.

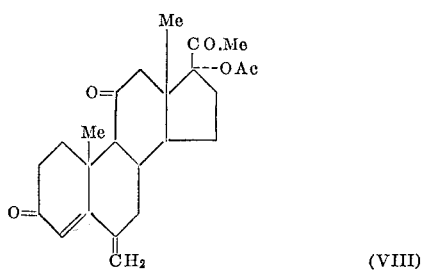

(VIII)

Thus the crude VII may be dissolved in, for example, 90% aqueous acid, kept at 80° C. for 15 minutes, and then diluted with water. Compound VIII is precipitated in crystalline form and may, if desired, be purified by conventional techniques. In order to effect isomerisation of the double bond system present in VIII into the required 6-methyl-4,6-dien-3-one system, Compound VIII is heated in a suitable solvent in the presence of a hydrogenation catalyst and optionally in the presence of catalytic quantities of a hydrogen donor such, for example, as cyclohexene. In order to minimise reduction of the double-bond system, it is advantageous to employ a slightly alkaline, buffered medium, conveniently obtained by the addition of, for example, sodium acetate to the reaction mixture. The reaction may be followed by determination of the ultra-violet spectra of aliquots withdrawn at intervals, and is complete when the absorption at 283mμ, characteristic of the product I of the present invention, is at maximum intensity. The product may be isolated by removal of the catalyst by filtration, and dilution of the clear solution with water. The precipitated material may be collected by filtration or extraction and subsequently purified by conventional techniques.

An alternative form of the process of the present invention consists in the reduction of the intermediate formed in the reaction of 17α-acetoxy-3-methoxypregna-3,5-diene-11,20-dione V with the Vilsmeier reagent so as to form 17α-acetoxy-6-dimethylaminomethyl-3-methoxypregna-3,5-diene-11,20-dione IX.

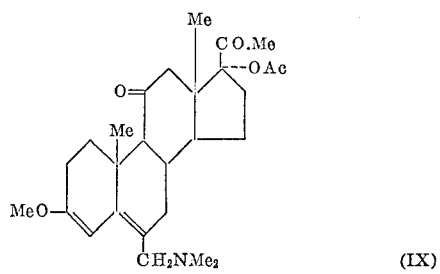

(IX)

Thus, to the solution obtained by the addition of the enol ether V to the Vilsmeier reagent, is added, under anhydrous conditions, a dry solution of a reducing agent. Such solutions may include, for example, sodium borohydride in pyridine, lithium borohydride in tetrahydrofuran, the pyridine-borane adduct in ether, or diborane gas. Not less than one equivalent of the reducing agent is employed. As will be apparent to those skilled in the art, in the presence of an excess of reducing agent (other than diborane and its amine adducts) the product will consist of a mixture of the amine IX with its borane adduct. This however is not a disadvantage, and such mixtures may be employed in subsequent stages without purification. The reduction process is rapid, and will, in general, be complete within 15 minutes at 0° C. The reaction mixture is then poured into water and the product is isolated by extraction. This product is converted, conveniently without purification, into 17α-acetoxy-3-methoxy-6-methylpregna-3,5-diene-11,20-dione X.

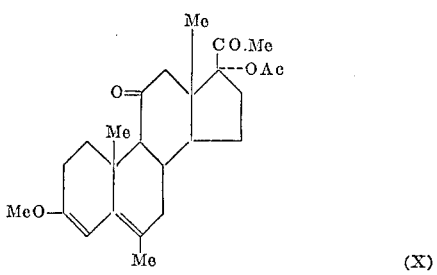

(X)

Thus the product may be treated with Raney nickel, or it may be hydrogenated over a catalyst such as palladium on charcoal. In the preferred form of the present invention, the amine/amine-borane mixture is heated, in a buffered medium, with a catalyst in the presence of a hydrogen donor. Thus, the amine/amine-borane mixture may be heated in a suitable solvent such, for example, as methanol or ethanol with palladium-on-charcoal and cyclohexane. It is advantageous to have present a buffer mixture such, for example, as sodium acetate-acetic acid to ensure a slightly acidic reaction medium. Reaction is generally complete within 6 hours, and the product may be isolated by conventional techniques. The Compound I of the present invention is obtained from the 6-methyl enol ether (X) by dehydrogenation with a high potential quinone. Thus treatment of (X) with, for example, chloranil in tert.-butanol under reflux or with 2,3-dichloro-5,6-dicyanobenzoquinone in acetone at room temperature effects dehydrogenation and hydrolysis of the enol ether system with production of the desired 6-methyl-4,6-dien-3-one present in the product (I) of the present invention.

Following is a description by way of example of methods of carrying the invention into effect.

Example 1.—17α-acetoxypregn-4-ene-3,11,20-trione

A mixture of 17α-hydroxypregn-4-ene-3,11,20-trione (6 g.), acetic anhydride (50 ml.) and toluene-p-sulphonic acid (0.75 g.) is stirred at 50° C. for 4 hours and then poured into a large volume of water. The precipitated solid is collected, washed and dried and refluxed for 1 hour in methanol (100 ml.) containing 2% of concentrated hydrochloric acid. Dilution with water gave a crystalline precipitate which was crystallised from aqueous methanol to give 17α-acetoxypregn-4-ene-3,11,20-trione as flakes, M.P. 203–204° C., $[\alpha]_D^{25}$ +143° (c., 0.95 in chloroform), $\lambda_{max.}^{EtOH}$ 237 mμ (ε, 16,830)

Example 2.—17α-acetoxy-3-methoxypregna-3,5-diene-11,20-dione

A solution of 17α-acetoxypregn-4-ene-3,11,20-trione (2 g.), dry dioxan (10 ml.), methylorthoformate (2.5 ml.), methanol (1 drop) and concentrated sulphuric acid (1 drop) was kept at room temperature for 1 hour, neutralised with pyridine, and poured into water. Crystallisation of the precipitated solid from aqueous methanol containing a trace of pyridine gave 17α-acetoxy-3-methoxypregna-3,5-diene-11,20-dione as needles, M.P. 175–177° C., $[\alpha]_D^{26}$ −74.5° (c., 1.2 in dioxan)

$\lambda_{max.}^{EtOH}$ 240 mμ (ε, 19,865)

Example 3.—17α-acetoxy-6-formyl-3-methoxypregna-3,5-diene-11,20-dione

A solution of 17α-acetoxy-3-methoxypregna-3,5-diene-11,20- dione (7 g.) in ethylene dichloride (50 ml.) was added to a solution of the complex prepared from dimethylformamide (2.7 ml.) and phosphoryl chloride (1.8 ml.) in ethylene dichloride (25 ml.) and the mixture was stirred at 0° C. for 1 hour. Aqueous sodium acetate was added, the mixture was stirred at room temperature for 15 minutes and then extracted with ether. Evaporation of the water-washed and dried extract afforded a gum which was crystallised from aqueous methanol to give 17α-acetoxy-6-formyl-3-methoxypregna-3,5-diene-11,20 - dione as flakes, M.P. 214° C., $[\alpha]_D^{26}$ −91.5° (c., 0.7 in chloroform)

$\lambda_{max.}^{EtOH}$ 218.5 (ε, 11,530) and 320 mμ (ε, 15,550)

Example 4.—17αacetoxy-6-methylenepregn-4-ene-3,11,20-trione

A mixture of 17α-acetoxy-6-formyl-3-methoxypregna-3,5-diene-11,20-dione (3.5 g.) and sodium borohydride (0.15 g.) in ethanol (100 ml.) was stirred at room temperature for 1 hour. The solution was concentrated under reduced pressure, poured into water and extracted with ether. Evaporation of the water-washed and dried extract afforded a gum which was dissolved in acetic acid (25 ml.) and water (5 ml.) and kept at 80° C. for 15 minutes. Dilution with water gave a crystalline precipitate which was crystallised from dichloromethane-methanol to give 17α-acetoxy-6-methylenepregn-4-ene - 3,11,20 - trione as laths, M.P. 241–243° C., (dependent on rate of heating), $[\alpha]_D^{26}$ +281° (c., 0.8 in chloroform), $\lambda_{max.}^{EtOH}$ 257 mμ (ε, 15,580)

Example 5.—17α-acetoxy-6-methylpregna-4,6-diene-3,11,20-trione

A mixture of 17α-acetoxy-6-methylenepregn-4-ene-3,11,20-trione (1 g.), sodium acetate (0.25 g.), 5% palladium on charcoal (0.25 g.) and ethanol (50 ml.) was stirred under reflux for 2 hours. The catalyst was filtered off and the solution was diluted with water. Crystallisation of the precipitated material from dichloromethane-methanol gave 17α-acetoxy-6-methylpregna 4,6-diene-3,11,20-trione as flakes, M.P. 216–217° C., $[\alpha]_D^{25}$ +177° (c., 1.0 in chloroform)

$\lambda_{max.}^{EtOH}$ 283 mμ (ε, 22,700)

Example 6.—17α-acetoxy-3-methoxy-6-methylpregna-3,5-diene-11,20-dione

A solution of 17α-acetoxy-3-methoxypregna-3,5-diene-11,20-dione (4 g.) in ethylene dichloride (25 ml., containing 0.5 ml. pyridine) was added at 0° C. to a solution of the complex prepared from dimethylformamide (2 ml.) and phosphoryl chloride (1.1 ml.) in ethylene dichloride (10 ml.) and the mixture was stirred at 0° C. for 1 hour. A solution of lithium borohydride in anhydrous tetrahydrofuran (3%, 10 ml.) was added and after a further 5 minutes at 0° C. the mixture was poured into water. The organic material was extracted with ether, the extract was washed with water, dried and evaporated to dryness. A mixture of the residual gum, ethanol (50 ml.), cyclohexene (10 ml.), sodium acetate (12 g.), acetic acid (4 ml.) and 5% palladium-charcoal (1 g.) was stirred and refluxed for 4 hours. The catalyst was removed by filtration and water was added to the mother liquor. Recrystallisation of the precipitated material from dichloromethane-methanol containing a trace of pyridine gave 17α-acetoxy-3-methoxy-6-methylpregna - 3,5 - diene-11,20-dione as prisms, M.P. 226° C., $[\alpha]_D^{28}$ −108° (c., 1.2 in dioxan)

$\lambda_{max.}^{EtOH}$ 245 mμ (ε, 19,000)

Example 7.—17α-acetoxy-6-methylpregna-4,6-diene-3,11,20-trione

A mixture of 17α-acetoxy-3-methoxy-6-methylpregna-3,5-diene-11,20-dione (1 g.), chloranil (1 g.) and tert.-butanol (25 ml.) was refluxed for 2 hours. The cooled solution was diluted with ether, washed with dilute aqueous sodium carbonate and water, dried and evaporated to dryness. Crystallisation of the residue from dichloromethane-methanol gave 17α-acetoxy-6-methyl-pregna-4,6-diene-3,11,20-trione, M.P. 216–217° C., identical with that prepared as in Example 5.

We claim:
1. 17α-acetoxy-6-methylpregna-4,6-diene - 3,11,20-trione.
2. 17α-acetoxy-6-formyl-3-methoxypregna - 3,5-diene-11,20-dione.
3. 17α-acetoxy-6-methylenepregn-4-ene-3,11,20-trione.

References Cited

UNITED STATES PATENTS

| | | | |
|---|---|---|---|
| 3,084,159 | 4/1963 | Kirk et al. | 260—239.55 |
| 3,120,548 | 2/1964 | Ercoli et al. | 260—239.55 |
| 3,145,199 | 8/1964 | Graber et al. | 260—239.55 |
| 3,316,252 | 4/1967 | Ringold | 260—239.55 |

FOREIGN PATENTS 1,048,914 11/1959 Germany.

ELBERT L. ROBERTS, *Primary Examiner.*